United States Patent [19]
Blackman et al.

[11] Patent Number: 5,613,208
[45] Date of Patent: Mar. 18, 1997

[54] CHANNEL SCAN IN CELLULAR TELEPHONE SYSTEM

[75] Inventors: Hans Blackman, Malmoe; Sven Tryding, Lund, both of Sweden

[73] Assignee: Ericsson Inc., Research Triangle Park, N.C.

[21] Appl. No.: 254,915

[22] Filed: Jun. 6, 1994

[51] Int. Cl.⁶ .................................................. H04Q 9/00
[52] U.S. Cl. ........................ 455/34.1; 455/34.2; 455/38.3; 455/343
[58] Field of Search ....................... 455/32.1, 33.1, 455/34.1, 34.2, 38.3, 54.1, 54.2, 56.1, 58.2, 68, 70, 161.1, 343; 379/61, 63

[56] References Cited

U.S. PATENT DOCUMENTS

| | | | |
|---|---|---|---|
| 4,479,261 | 10/1984 | Oda et al. | 455/33.3 |
| 4,618,998 | 10/1986 | Kawamura | 455/77 |
| 4,736,461 | 4/1988 | Kawasaki et al. | 455/343 |
| 4,903,319 | 2/1990 | Kasai et al. | 455/33.1 |
| 5,119,502 | 6/1992 | Kallin et al. | 455/34.2 |
| 5,197,093 | 3/1993 | Knuth et al. | 379/61 |
| 5,212,803 | 5/1993 | Uddenfeldt et al. | 455/33.1 |
| 5,241,542 | 8/1993 | Natarajan et al. | 370/95.3 |
| 5,375,254 | 12/1994 | Owen | 455/54.1 |

FOREIGN PATENT DOCUMENTS

| | | |
|---|---|---|
| 2085686 | 5/1994 | Canada . |
| 0234201 | 9/1987 | European Pat. Off. . |

OTHER PUBLICATIONS

Service Manual for Ericsson Mobile Phone 1941, EN/LZB 126 1219 RIA, available from Ericsson Mobile Communications AB, CM/S, S–223 70 Lund, Sweden.

*Primary Examiner*—Reinhard J. Eisenzopf
*Assistant Examiner*—Lee Nguyen
*Attorney, Agent, or Firm*—Burns, Doane, Swecker & Mathis, L.L.P.

[57] ABSTRACT

A method and apparatus for controlling scanning of radio channels by mobile stations in a cellular radiotelephone system, including transmitting from a base station a control signal, e.g., a battery savings order, to a group of mobile stations for informing the group of mobile stations that no pages will be issued directed to them for a predetermined period, upon receipt of which the mobile stations begin scanning during the predetermined period radio channels to identify which radio channels have superior characteristics, and storing the channels identified to have superior characteristics for later use as respective access and control channels.

17 Claims, 3 Drawing Sheets

CHANNEL SCAN IN CELLULAR TELEPHONE SYSTEM

BACKGROUND OF THE INVENTION

1. Field of the Invention

The present invention relates to a channel scanning method and apparatus for use in a cellular telephone system, and more particular, to a method and apparatus for scanning control and access channels during a period of reduced battery consumption.

2. Discussion of Related Art

Cellular telephone systems are designed to permit radio communications with mobile stations which, by their mobility, can cross boundaries between radio zones, or cells, the cells being defined as areas serviced by relatively immobile base stations within the cells. Because of their need for mobility, the mobile stations typically are battery operated, whether vehicle mounted, portable, or pocket telephones. The battery life becomes an important factor in cellular systems and, consequently, power consumption is an important issue for mobile stations.

In order to increase battery life, various mechanisms for decreasing power consumption have evolved. One such mechanism is to impose one or more of an idle mode, a standby mode, and a sleep mode on mobile telephones wherein in these modes various functions and/or portions of the mobile telephone circuitry are turned off to decrease overall power consumption.

In the idle mode, a mobile telephone operating within, e.g., the Nordic Mobile Telephone (NMT) system is locked on a control channel (CC), sometimes referred to as a calling channel, to be ready to receive a page, which is the first step in initiating a telephone link with a base station. The mobile station is not actively engaged in a voice communications link, i.e., a conversation. Under the NMT standard, in the standby mode the mobile station rests on a calling channel with valid traffic area number and calling channel prefix. In the standby mode, the mobile station is ready for reception or initiation of a call. If the mobile station loses a lock on the calling channel (the signal strength falls below a given limit), it starts a scanning procedure for searching for a new, stronger calling channel. If the user initiates a call, the mobile station leaves the standby mode and enters the procedure for initiating a call according to NMT standards. In a sleep mode, the mobile station is responsive to the fewest functions, limited to only user initiated functions.

Conventionally, a mobile telephone does not continuously scan for the strongest control channel. When a call is placed, an NMT telephone randomly selects a starting channel among a group of prestored access channels (AC's), to begin an access channel scan. The mobile station will select and use the first access channel whose signal strength is sufficiently high. The selected access channel is then used to initiate a call link set-up procedure.

To save battery life, in the NMT system for example, base stations send out battery saving orders (BSO's) to groups of mobile stations. The groupings are designated by the mobile system. The system, by issuance of BSO's, orders groups of mobile stations to go into a sleep mode, wherein the greater part of the circuitry of the mobile station becomes inactive to further reduce battery consumption. A typical BSO period is a few seconds, and the length of the BSO period is usually determined by the call frequency in the system (e.g., the load at the mobile switching center which services a group of base stations). If a call is placed to a mobile station during the period designated by the BSO, the call will be put on hold in the mobile switching center (which controls several base stations) until the BSO period has terminated.

SUMMARY OF THE INVENTION

During the battery saving period designated by a battery saving order, a mobile station in accordance with the present invention scans for a new, better control channel and/or access channel, and stores the identified, better channel for future use. The mobile station switches to listening to the best control channel at the end of the BSO period and stores the best access channel for faster call initiation or set-up. Other factors involved in initiating the channel scan include a determination of whether the mobile station is vehicle mounted and a determination as to the last time a channel scan has taken place.

BRIEF DESCRIPTION OF THE DRAWINGS

The present invention will now be described with reference to the accompanying drawing in which.

DETAILED DESCRIPTION OF PREFERRED EMBODIMENTS

Figure 1:
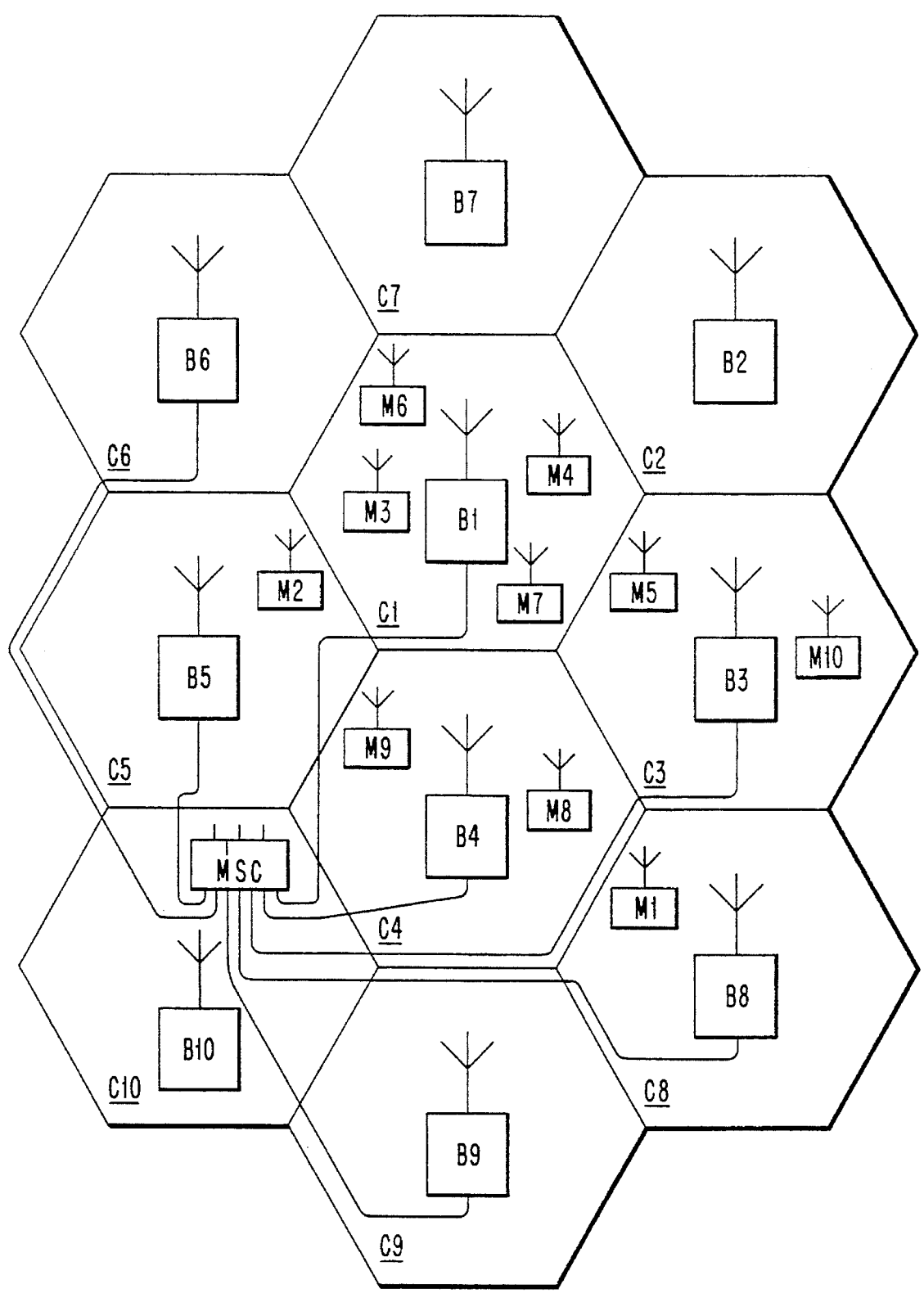
FIG. 1 is a schematic diagram illustrating an example of a cellular mobile radio system, illustrating the relationship of the systems cells, a mobile switching center and mobile stations.

To facilitate consideration of the present invention, a brief description of a typical cellular mobile radio telephone system is provided. Further details as to the hardware and operation of an exemplary mobile cellular system can be found in U.S. Pat. No. 5,119,502 issued to Kallin et al. on Jun 2, 1992, and in the Service Manual for Ericsson Mobile Phone 1941, EN/LZB 126 1219 R1A available from Ericsson Mobile Communications AB, CM/S, S-223 70 Lund, Sweden, herein incorporated by reference.

A typical cellular mobile radio telephone system is controlled by at least one mobile switching center (also known as a mobile telephone switching office or exchange), at least one base station, and at least one mobile station. The mobile switching center constitutes an interface between the radio system and the public switching telephone network. The base station transmits information between the mobile stations and the mobile switching centers. Calls to and from mobile subscribers are switched by the mobile switching center. The mobile switching center also provides all signalling functions needed to establish the calls. In order to obtain radio coverage of a geographical area sometimes referred to as a mobile telephone exchange (MTX) area, a number of base stations are normally required. This number may range from, in an exceptional case, one base station, up to one hundred or more base stations in normal systems. The area is divided into cells, where each cell may either be serviced by a base station or may share a base station with a number of other cells. Each cell has an associated control channel over which control (non-voice) information is communicated between the mobile units in that cell and the base station. Generally speaking, the control channel includes a dedicated channel at a known frequency over which certain information is communicated from the base station to mobile stations, an access channel for unidirectional transmissions of information from the base station to the mobile stations, and one or more traffic channels for bidirectional communications between the mobile stations and the base station. These various channels may share the same frequency, or they may operate at different respective frequencies. In the NMT system duplex channels are used so that a conversation can progress simultaneously in both directions.

Three types of transmissions normally take place on the control channels between the mobile stations and the base stations. First, when a mobile station is originating a call, it sends an access request to the base station whose control channel has the strongest signal. This access request informs the base station that the requesting mobile station needs to be assigned a voice channel (i.e., traffic channel) over which the call can be connected. Second, when a mobile station is paged by a base station over the control channel, indicating that the base station has a call to be completed to the mobile subscriber, the paged mobile station sends back a paging response on the access channel. Finally, when a mobile station travels from one cell to another, or from one traffic area to another, or for other reasons, the mobile station may send a registration access over the access channel to identify itself and its presence to the telephone exchange associated with the cell.

To facilitate paging, that is, searching for a mobile unit, a service area may be divided into traffic areas, each consisting of a number of cells. When a mobile station leaves one traffic area and enters another, it is requested by the mobile switching center to repeat its new location. In this way, the mobile station can be searched for over a limited number of base stations.

A mobile station in an idle state, i.e., with no active call taking place, will listen for pages and other information on the control channel having the strongest signal strength. The mobile station will stay tuned to the access channel until it either initiates an access, e.g., a registration, call access-or paging response, or performs a rescan of all the control channels within its range to determine if a new control channel has a stronger signal strength than the current control channel.

In cellular radio systems, since the mobile station may move, the quality of the received signal may deteriorate if the mobile station leaves the base station's coverage area. As the quality of the received signal is reduced, the ability to correctly detect and interpret data messages is also reduced. This decreases the probability of, for example, receiving incoming calls.

By performing a rescan of all control channels (which might be 21 channels, for example) and selecting the control channel with the strongest signal strength, the word error rate of signals received at the mobile station may decrease, thereby increasing the probability of correctly receiving messages on the control channel.

Before describing further details of the present invention, an example of the construction of a cellular mobile radio system in which the present invention can be used will be discussed with reference to FIG. 1.

FIG. 1 is a schematic diagram illustrating ten cells, C1 to C10, in a cellular mobile radio telephone system. Normally the method according to the present invention would be implemented in a cellular mobile radio system comprising many more cells than ten. For purposes of this discussion, the system depicted herein is considered to be an isolated portion of a larger system.

For each cell C1 to C10, there is a respective base station B1 to B10. FIG. 1 illustrates base stations situated in the vicinity of the respective cell centers and having omnidirectional antennas. The base stations of adjacent cells may, however, be collocated in the vicinity of cell borders and have directional antennas.

FIG. 1 also illustrates ten mobile stations (e.g., vehicle mounted, portable and pocket telephones) M1 to M10, which are movable within a cell and from one cell to another cell. The method according to the present invention may be implemented in a cellular mobile radio system comprising many more mobile stations than ten. In particular, them are normally many more mobile stations than there are base stations.

Also illustrated in FIG. 1 is a mobile switching center (a.k.a., mobile switching office or exchange). The mobile switching center MSC illustrated in FIG. 1 is connected to all ten illustrated base stations by cables. The mobile switching center is connected by cables also to a fixed public switching telephone network or similar fixed network with ISDN facilities. All cables from the mobile switching center to base stations and cables to the fixed network are not illustrated. Further, other media may be used instead of cables for base to mobile switching center communications, e.g., fixed radio links.

Figure 2:
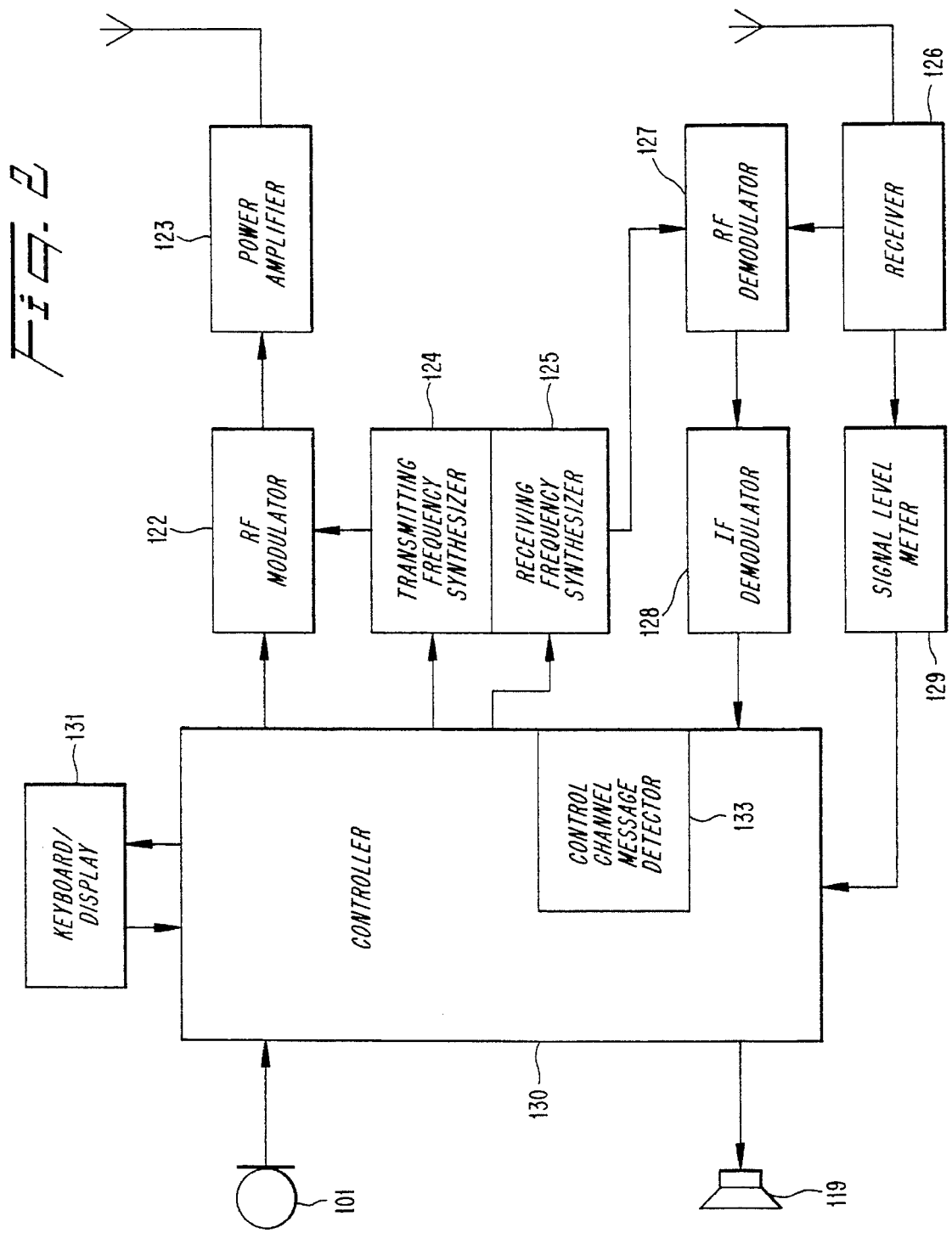
FIG. 2 is a block diagram illustrating a mobile station in a cellular mobile radio system according to FIG. 1.

As illustrated in FIG. 2, a mobile station includes a microphone 101, which in turn is connected to a controller 130. The controller 130 may be in the form of function blocks, such as shown in FIG. 2 of U.S. Pat. No. 5,119,502, or as shown in the Service Manual for the Ericsson Mobile Phone 1941 cited above, or any suitable circuitry having sufficient computing power to carry out the present invention.

A receiver carrier frequency signal is generated in accordance with a selected receiving channel by a receiving frequency synthesizer 125. Incoming radio frequency signals are received by a receiver 126, the strength of which are measured by a signal level meter 129. The received signal strength value is then sent to the microprocessor based controller 130. An RF demodulator 127, which receives the receiver carrier frequency signal from the receiving frequency synthesizer 125 and the radio frequency signal from the receiver 126, demodulates the radio frequency carrier signal, thus generating an intermediate frequency IF). The intermediate frequency signal is then demodulated by an IF demodulator 128, which stores the original information, for example π/4-DQPSK modulated digital information or analog information. A controller 130 includes a control channel message detector 133 which is sent control channel messages and supplies detected control information to a microprocessor in the controller 130.

The microprocessor based controller 130 controls the mobile station activity and the base station communication, and also handles the terminal keyboard input and display output 131. Decisions by the controller 130 are made in accordance with received messages and measurements that are made. The keyboard and display unit 131 enable information to be exchanged between the user and the base station. Also included in the mobile station is a speaker 119 for generating sound corresponding to a received voice signal.

If the present invention is implemented in a digital system, then a speech coder may be placed between the microphone 101 and the controller 130 and a decoder may be connected between the speaker 119 and the controller 130, along with other system components as disclosed in U.S. Pat. No. 5,119,502, for example. If the present invention is implemented in a system such as the analog NMT system, a duplex filter and a single antenna (or plural antennas with an antenna switch) may be incorporated such as shown in the Service Manual for the Ericsson Mobile Phone 1941 cited above.

One of the primary tasks performed in the system access mode of the mobile station is the generation of an access message in the mobile station and preparation of a suitable traffic channel for information exchange. The access channels available to the mobile, which were updated during the idle mode and during the BSO period, are examined in a manner similar to the measuring of the dedicated control channels as previously described. A ranking of the signal strength of each is made, and the channel associated with the strongest signal is chosen. The transmitting frequency synthesizer 124 and the receiving frequency synthesizer 125 are tuned accordingly, and a service request message is sent over the selected channel via a RF modulator 122, a power amplifier 123 and an antenna in order to inform the base station about the type of access wanted, e.g., call origination, page response, registration request or order confirmation.

After completion of this message, the amplifier 123 of the mobile station is turned off and the mobile station may wait for further control messages. Depending on the access type, the mobile station will then receive an adequate message from the base station.

If the access type is origination or paging, the mobile station is assigned a free traffic channel by the base station, and the mobile station takes over the control of the traffic channel and leaves the system access mode. The mobile station then tunes the transmitting frequency synthesizer 124 and the receiving frequency synthesizer 125 to the frequencies associated with the chosen traffic channel. A time alignment procedure is controlled by the base station and is based on time delay measurements which are performed at the base station on the received signal. From this moment on, the exchange of messages between the base station and the mobile station are transferred over, e.g., a fast associated control channel (FACCH) and a slow associated control (SACCH).

A brief description of the NMT specification for a handheld mobile station with a battery saving function follows. For more details, reference is made to NMT Doc. 900-3, herein incorporated by reference.

A battery saving mobile station is defined as the hand-held mobile station or the like which can process received battery saving orders (BSO's). The BSO's typically address a group of mobile stations wherein all mobile stations within the system are assigned to one of a plurality of groups according to the last digit in the mobile station subscriber number, for instance. Upon receipt of a BSO, the mobile stations within a group may close down or turn off certain preselected functions other than the display in visual indicators and user initiated operations. An extra display may be incorporated to signify the occasion of a battery saving period.

The preselected functions are closed down for a time period set by the BSO, such periods being 0, 5, 10, 15, 20, 25, 30 or 35 seconds, for example. This time period is longer than a frame length as evident from the Service Manual for the Ericsson Mobile Phone 1941, cited above, at page 12, wherein a frame of 64 bits is transmitted at a speed of 1200 bits per second, indicating a frame length of less than 54,000ths of a second.

Immediately after the battery saving period has expired, the mobile station is locked to the same channel it was locked before receiving the BSO. This aspect of the conventional NMT specification is modified in accordance with the present invention. After the battery saving period has expired, the mobile station is immediately able to receive any information on the memorized control channel. If the memorized control channel is inadequate the mobile station begins searching for a new control channel, according to conventional NMT standards. The present invention reduces or eliminates the need for this procedure.

The battery savings mode should be distinguished from the standby state, in which the mobile station remains ready for reception or initiation of a call. In the battery savings mode, the mobile station is not ready for reception of a call, and the cellular system will not attempt to initiate calls with the group of mobile stations it has ordered to be in the battery savings mode. Calls are put on hold in the mobile switching center until the end of the battery savings period for the group into which the called mobile station belongs. Specifically, the mobile station may close the receiver for the period indicated in the information field of a BSO.

Figure 3:
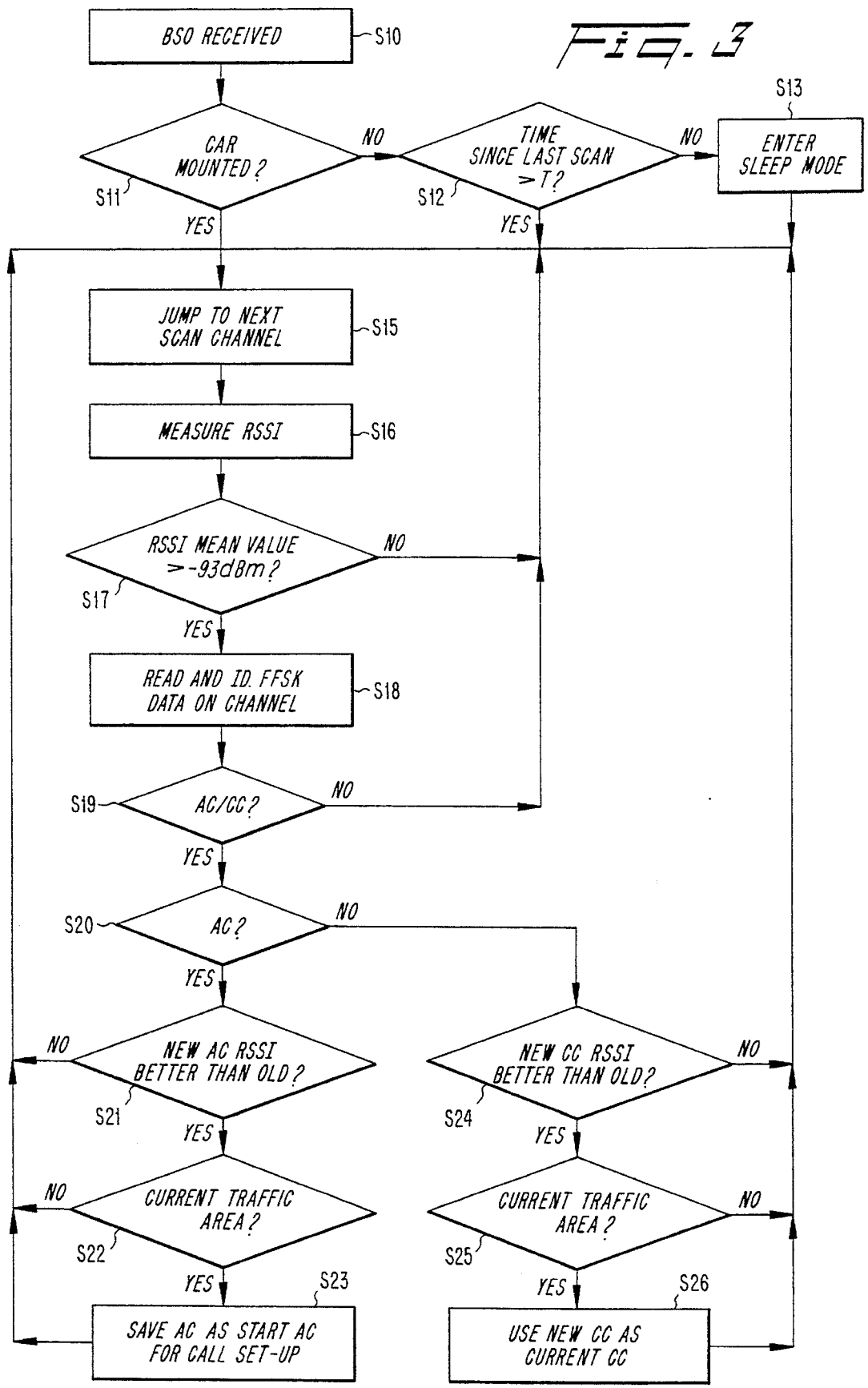
FIG. 3 is a flowchart of a channel scanning method in accordance with the present invention.

With reference to the accompanying flowchart of FIG. 3, the present invention will now be described. This flow chart is followed every time a BSO is received.

Upon receipt of a BSO by a mobile station (step S10), it is determined whether the mobile station is car mounted and therefore has a greater likelihood of being relatively fast moving between cells (step S11). If the mobile station is not car mounted, the time since the last channel scan is determined to be either greater or less than a predetermined time T, typically 1 minute (step S12).

If time since the last scan is less than the predetermined time T, then the mobile station enters the battery savings mode (step S13) based on the assumption that the recent channel scan results are still accurate. However, if the time since the last channel scan is greater than the predetermined time T, or if the mobile station is car mounted, the method then retunes to the next scan channel among a group of scan channels stored in the mobile station (step S15).

Once the mobile station is fixed to the next channel to be measured, a received signal strength indicator (RSSI) is determined in accordance with known techniques (step S16). If the mean value of the RSSI is not greater than, e.g., −93 dBm (1 µV) (step S17), then the mobile station returns to step S15 and retunes to the next scan channel. However, if the mean value of the RSSI is greater than 93 dBm then the mobile station proceeds to read and identify Fast Frequency Shift Keying (FFSK) data on the channel being scanned (step S18).

Once this data is acquired, the mobile station proceeds to identify whether the channel being scanned is an access channel or a control channel (step S19). If it is neither an access channel nor a control channel, the mobile station returns to step S15 to be retuned to the next scan channel.

However, if the scan channel is an access channel (step S20) then it is determined whether the access channel RSSI is better than the old access channel RSSI (step S21). If it is not, the mobile station returns to step S15. However, if the new access channel RSSI is better than the old access channel RSSI, then it is determined whether the new access channel is part of the current traffic area (step S22), rather than a neighboring traffic area by the traffic area code sent on the calling channel. If the access channel is not part of the current traffic area, then it does not store the new access channel and the procedure returns to step S15. This is because the mobile station is not registered in the neighboring traffic area and to be registered which would require a registration procedure (a.k.a., "roaming") such as used in the conventional NMT system. Otherwise the burden that would be placed on the exchanges would be too great if the mobile stations registered with a new traffic area every time they detected a stronger channel from a neighboring traffic area, particularly travelling along the boarder between two service areas.

If, however, the access channel is part of the current traffic area, then the access channel is saved for the start access channel which may be used later for call set-up (step S23) and thereafter the system returns to step S15 to search for an even better access channel.

If it is determined that the channel being scanned is a control channel (step S20), then it is determined whether the new control channel is better than the old control channel (step S24). If it is not, then the mobile station returns to step S15. If the new control channel is better than the old control channel, then it is determined whether the control channel is part of the current traffic area (step S25). If it is not, then again the mobile station returns to step S15. If the new, better control channel is part of the current traffic, area, then the new control channel is stored as the current control channel (step S26) and the system returns to step S15 to search for an even better control channel.

It can be seen from the foregoing description that the BSO acts as or a form of a rescan order to cause the mobile station to rescan preselected radio channels during a BSO period wherein the system will not transmit pages directed to the mobile stations to which the BSO was directed. Also, the present invention takes into consideration the amount of time since the last scanning operation and whether the mobile station is likely to be relatively fast moving between cells in determining whether to initiate a channel scanning operation.

The present invention is usable in any suitable radio communications system transmitting over a plurality of control channels, including analog or digital systems (TDMA, CDMA), which involve fixed stations broadcasting power reduction orders to battery operated stations.

From the foregoing description of the specific embodiments others can readily modify and/or adapt for various applications such specific embodiments without departing from the general nature of the invention, and, therefore, such adaptations and modifications should and are intended to be comprehended within the meaning and range of equivalence of the disclosed embodiments. It is to be understood that the phraseology and terminology employed herein is for the purpose of description and not of limitation.

What is claimed is:

1. A method for controlling scanning of radio channels by mobile stations in a cellular radiotelephone system, wherein said mobile stations are operationally connected to at least one base station over a plurality of radio channels, the method comprising the steps of:

transmitting from a base station a control signal to at least one mobile station for informing said at least one mobile station that no pages will be issued directed to said at least one mobile station for a predetermined period;

receiving, in said at least one mobile station, said control signal;

scanning during said predetermined period, in said at least one mobile station, said radio channels to identify which radio channels have superior characteristics; and storing, in said mobile station radio, channels determined to have superior characteristics.

2. A method according to claim 1, wherein said control signal is a battery saving order directing a group of mobile stations to power down at least one preselected function, and wherein at least one mobile station of said group of mobile stations, upon receipt of said battery saving order, instead performs said scanning step during said.

3. A method according to claim 1, wherein said predetermined period is longer than a frame length.

4. A method according to claim 3, wherein said radio channels include access channels and control channels.

5. A method according to claim 3, wherein said characteristics include signal strength.

6. A method according to claim 1, wherein said predetermined period is one of 5, 10, 15, 20, 25, 30, and 35 seconds.

7. A method according to claim 1, wherein during said predetermined period, a call is placed to a mobile station will be put on hold until the predetermined period has terminated.

8. A method for controlling scanning of radio channels by mobile stations in a cellular radiotelephone system, wherein said mobile stations are operationally connected to at least one base station over a plurality of radio channels, the method comprising the steps of:

transmitting from a base station a control signal to at least one mobile station for informing said at least one mobile station that no pages will be issued directed to said at least one mobile station for a predetermined period;

receiving, in said at least one mobile station, said control signal;

scanning during said predetermined period, in said at least one mobile station, said radio channels to identify which radio channels have superior characteristics;

storing in said mobile station radio, channels determined to have superior characteristics;

determining whether a mobile station is mounted to a vehicle;

determining an amount of time elapsed since a previous channel scanning operation; and entering a sleep mode if said elapsed amount of time is less than a predetermined amount of time and said mobile station is not vehicle mounted or initiating said scanning step if said mobile station is vehicle mounted or said elapsed amount of time is greater than said predetermined amount of time.

9. A method for controlling scanning of radio channels by mobile stations in a cellular radiotelephone system, wherein said mobile stations are operationally connected to at least one base station over a plurality of radio channels, the method comprising the steps of:

transmitting from a base station a control signal to at least one mobile station for informing said at least one mobile station that no pages will be issued directed to said at least one mobile station for a predetermined period;

receiving, in said at least one mobile station, said control signal;

scanning during said predetermined period, in said at least one mobile station, said radio channels to identify which radio channels have superior characteristics wherein said scanning step further comprises the step of identifying whether a radio channel being scanned is one of a control channel and an access channel having superior characteristics; and storing, in said mobile station radio, channels determined to have superior characteristics wherein said storing step includes the step of storing a radio channel.

10. A mobile station capable of communicating with at least one base station over a plurality of radio channels, said mobile station comprising:

receiving means for receiving radio transmissions from at least one base station;

demodulating means for demodulating radio transmissions from at least one base station received by said receiving means;

a control channel message detector for extracting control information from at least a specific control message received by said receiving means and demodulated by said demodulating means, said specific control message informing said mobile station that no paging signals are to be expected during a predetermined time;

a signal level meter for determining the signal strength of a signal received by said receiving means;

a controller for controlling scanning of said radio channels when said specific control message is received, demodulated and detected and during said predetermined time, to determine which of said channels has the best characteristics and for storing said radio channels having the best characteristics.

11. A mobile station according to claim 10, wherein said specific control message is a battery saving order directing a group of mobile stations to power down at least one preselected function, and wherein at least one mobile station of said group of mobile stations, upon receipt of said battery saving order, instead performs said scanning step during said predetermined time.

12. A mobile station according to claim 10, wherein said predetermined time is longer than a frame length.

13. A mobile station according to claim 12, wherein said controller identifies whether a radio channel being scanned is one of a control channel and an access channel and stores a radio channel determined to have superior characteristics according to whether said radio channel is a control channel or an access channel.

14. A mobile station according to claim 12, wherein said characteristics include signal strength.

15. A mobile station according to claim 10, wherein said predetermined time is one of 5, 10, 15, 20, 25, 30 and 35 seconds.

16. A mobile station according to claim 10, wherein during said predetermined period, a call is placed to a mobile station will be put on hold until the predetermined time has lapsed.

17. A mobile station capable of communicating with at least one base station over a plurality of radio channels, said mobile station comprising:

receiving means for receiving radio transmissions from at least one base station;

demodulating means for demodulating radio transmissions from at least one base station received by said receiving means;

a control channel message detector for extracting control information from at least a specific control message received by said receiving means and demodulated by said demodulating means, said specific control message informing said mobile station that no paging signals are to be expected during a predetermined time;

a signal level meter for determining the signal strength of a signal received by said receiving means;

a controller for controlling scanning of said radio channels when said specific control message is received, demodulated and detected and during said predetermined time, to determine which of said channels has the best characteristics and for storing said radio channels having the best characteristics, wherein said controller determines whether a mobile station is mounted to a vehicle; determines an amount of time elapsed since a previous channel scanning operation; and enters a sleep mode if said elapsed amount of time is less than a predetermined amount of time and said mobile station is not vehicle mounted and initiates said channel scanning if said mobile station is vehicle mounted or said elapsed amount of time is greater than said predetermined amount of time.

* * * * *